(12) United States Patent
Lee et al.

(10) Patent No.: US 9,288,572 B2
(45) Date of Patent: Mar. 15, 2016

(54) HAPTIC MICROPHONE (71) Applicant: International Business Machines Corporation, Armonk, NY (US)

(72) Inventors: Gregory K. Lee, San Jose, CA (US); Sastra V. Malapaka, Old Bridge, NJ (US); Kenneth D. Maness, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/151,078

(22) Filed: Jan. 9, 2014

(65) Prior Publication Data

US 2015/0195645 A1 Jul. 9, 2015

(51) Int. Cl.
*H04R 19/04* (2006.01)
*H04R 1/46* (2006.01)
*H04R 21/02* (2006.01)
*H04R 3/00* (2006.01)
*H04R 1/08* (2006.01)
*H04R 29/00* (2006.01)

(52) U.S. Cl.
CPC *H04R 1/46* (2013.01); *H04R 1/083* (2013.01); *H04R 3/00* (2013.01); *H04R 29/004* (2013.01); *H04R 2420/07* (2013.01)

(58) Field of Classification Search
CPC ....... G06F 3/016; G06F 3/041; G06F 3/0202; G08B 6/00; G09B 21/003; H04M 1/03; H04M 19/04; H04M 19/047; H04R 1/005; H04R 1/04; H04R 1/08; H04R 1/083; H04R 1/086; H04R 1/406; H04R 3/00; H04R 19/04; H04R 23/004

USPC ............. 340/407.1, 407.2; 381/111, 355, 361
See application file for complete search history.

(56) References Cited

U.S. PATENT DOCUMENTS 8,279,052 B2 10/2012 Heubel
8,305,192 B2 11/2012 Connolly et al.
(Continued)

FOREIGN PATENT DOCUMENTS

JP 2003234679 A 8/2003
WO 9933323 A1 7/1999
(Continued)

OTHER PUBLICATIONS

Guo et al., "Analysis of Acoustic Feedback/Echo Cancellation in Multiple-Microphone and Single-Loudspeaker Systems Using a Power Transfer Function Method", IEEE Transactions on Signal Processing, vol. 59, No. 12, Dec. 2011, pp. 5774-5788.

*Primary Examiner* — Brian Ensey
(74) *Attorney, Agent, or Firm* — Lisa Ulrich; Hoffman Warnick LLC (57) ABSTRACT

A microphone having an embedded haptic device, along with an associated program product and methodology for controlling the haptic device. A microphone is disclosed that includes: a haptic device embedded therein capable of outputting a haptic response; and a haptic control system having an input system for receiving an external input associated with a use of the microphone, an analysis engine for analyzing the external input, and a haptic response controller for triggering the haptic response.

20 Claims, 4 Drawing Sheets

(56) References Cited

U.S. PATENT DOCUMENTS

| | | |
|---|---|---|
| 2007/0269050 A1 | 11/2007 | Rapps |
| 2007/0298743 A1 | 12/2007 | Chung |
| 2011/0013075 A1* | 1/2011 | Kim et al. .................. 381/56 |
| 2012/0108282 A1 | 5/2012 | Li et al. |
| 2012/0154144 A1 | 6/2012 | Betts et al. |
| 2012/0183156 A1* | 7/2012 | Schlessinger et al. ........ 381/111 |
| 2012/0254382 A1 | 10/2012 | Watson et al. |

FOREIGN PATENT DOCUMENTS

| | | |
|---|---|---|
| WO | 2011153638 A2 | 12/2011 |
| WO | 2012116083 A2 | 8/2012 |

* cited by examiner

HAPTIC MICROPHONE

BACKGROUND

1. Field of the Invention

The present invention relates to undesired conditions associated with the use of a microphone, and more particularly to a system and method that provides interactive haptic feedback to a user of a microphone indicating a predetermined condition has occurred.

2. Description of the Related Art

Wireless microphones have become widely used for many applications such as for presentations and performances. An ongoing issue with wireless microphones is that such devices are subject to feedback squelch, silence due to dead spots, out of range issues, interference, etc. Often, the user is not aware that a problem is occurring or is about to occur until it is too late.

Various squelch circuits have heretofore been proposed that for example mute the microphone when a problem condition exists. Similarly, echo suppression techniques are known that address feedback issues with the microphone and speaker echo. One of the problems with these solutions is that they are reactive in nature, and do not allow the problem to be avoided altogether.

SUMMARY

Disclosed is a haptic microphone system, as well as an associated program product and method in which the microphone provides haptic feedback to a user when a predetermined alert condition occurs.

According to one aspect of the present invention, a microphone is provided, comprising: a haptic device embedded therein capable of outputting a haptic response; and a haptic control system having an input system for receiving an external input associated with a use of the microphone, an analysis engine for analyzing the external input, and a haptic response controller for triggering the haptic response.

In a second aspect, a program product stored on a computer readable storage medium is provided, which when executed by a computer system, controls haptic response outputs for a microphone, comprising: program code for receiving an external input associated with a use of the microphone; program code for analyzing the external input to determine if an alert condition exists; and program code for triggering a haptic device associated with the microphone when the alert condition is present.

In a third aspect, a method of providing haptic feedback in a microphone having a haptic device is provided, comprising: receiving an external input associated with a use of the microphone; analyzing the external input to determine if an alert condition exists; and triggering the haptic device when the alert condition is present.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

Disclosed is a haptic microphone system and method in which the microphone provides haptic feedback to a user when an alert condition occurs. Haptic technology, or haptics, is a tactile feedback technology that takes advantage of the sense of touch by applying forces, vibrations, or motions to the user.

Figure 1:
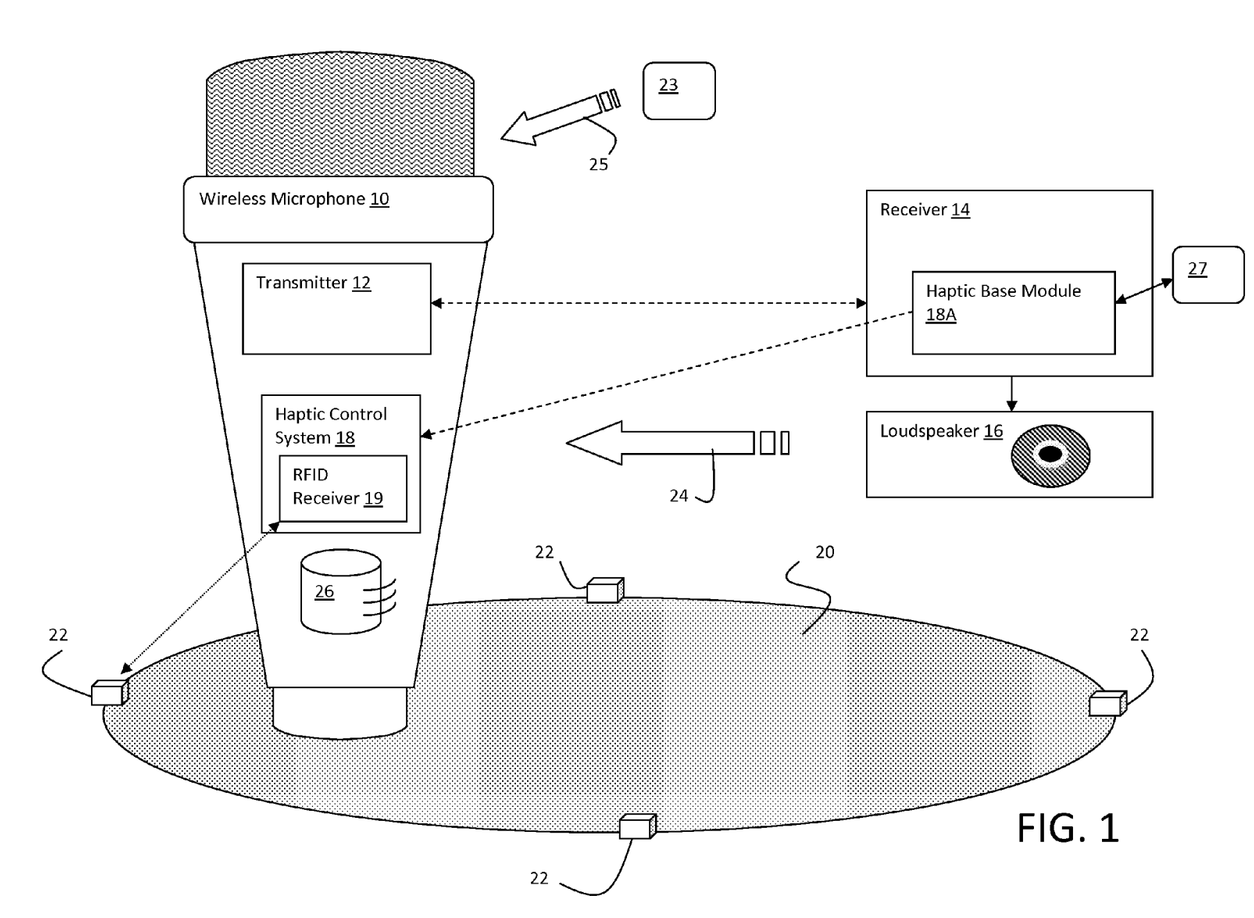
FIG. 1 depicts a wireless microphone having a haptic control system in accordance with embodiments of the present invention.

FIG. 1 depicts an illustrative embodiment showing a wireless microphone 10 having a standard transmitter 12 that communicates inputted audio signals from a user 23 to a remote receiver 14, which can then for example be amplified and broadcast over a loudspeaker 16. It is understood that although generally described with reference to a wireless microphone 10, the invention can be utilized in any type of microphone, including hand held microphones, wired microphones, microphones embedded into headsets, etc.

In addition to standard features found on a microphone, wireless microphone 10 also includes a haptic control system 18 and a haptic device 26 embedded therein. Based on an external input associated with a user of the wireless microphone 10, such as a detected condition or inputted warning, haptic control system 18 can activate haptic device 26 causing a haptic response, i.e., a non-auditory, non-visual sensory output such as a vibration. The haptic response acts as feedback for the user 23, alerting the user 23 to some condition associated with the use of the wireless microphone 10.

For the purposes of this disclosure any type of haptic technology may be implemented. In one illustrative embodiment, haptic device 26 may provide a haptic response using electromagnetic technologies such as vibratory motors, e.g., a vibrating alert similar to that used in a cell phone. In a more advanced embodiment, haptic device 26 may provide different types of responses indicating different external input conditions. Further, haptic device 26 may provide touch-coordinate specific responses, e.g., allowing the haptic effects to be localized to one or more portions of the wireless microphone 10, rather than the whole device. Such advanced haptic actuator technologies include, e.g., electro-active polymers, piezoelectric, electrostatic and subsonic audio wave surface actuation. These actuators can not only alert the user 23, but can also provide an enhanced user interface with a larger variety of haptic effects in terms of frequency range, response time and intensity.

As shown, haptic control system 18 can be implemented to detect and process various types of external inputs associated with the use of the wireless microphone 10 that might trigger a haptic response. For example, in one embodiment, the position or location of the wireless microphone 10 relative to a predefined area 20 may be analyzed to determine if the wireless microphone 10 is potentially out of range of the receiver 14. In an illustrative embodiment, radio frequency identification (RFID) tags 22 could be placed on a stage, indicating a signal boundary or echo feedback area for the wireless microphone 10. When the user 23 of the wireless microphone 10 moves close to an RFID tag 22, haptic control system 18 could utilize an RFID receiver 19 to sense the RFID tag 22 and activate the haptic device 26 to alert the user 23 that the user 23 is approaching an edge of the signal boundary. The user 23 can then relocate their position without any interruption to the user's performance. Any other technique for determining the location of the user 23 could likewise be utilized, e.g., a global positioning system (GPS) or cellular triangulation system could be incorporated into the wireless microphone 10.

In a further embodiment, haptic control system 18 could analyze the broadcast audio 24 coming from loudspeaker 16 to detect a problematic condition. For example, if the broadcast signal 24 was distorted, haptic control system 18 could recognize the distortion based on a frequency analysis and warn the user 23 with a haptic response.

In still a further embodiment, haptic control system 18 could be controlled, at least in part, from a remote haptic base module 18A. For instance, a remote user 27 could interface with haptic base module 18A to send alert conditions to the wireless microphone 10, such as that an allotted time for the user 23 has expired. Haptic base module 18A could likewise send automatically generated control signals to haptic control system 18, e.g., based on environment conditions the haptic base module 18A detects such as distortion, loss of signal, radio interference, etc.

In yet another embodiment, haptic control system 18 could analyze the audio signal 25 inputted from user 23. Thus for instance, if the user's mouth was too close or far away from the wireless microphone 10, a haptic response could be triggered. Further, if the user 23 was singing off-pitch, singing too slow or fast, too soft or loud, a haptic response could likewise be triggered. The audio signal 25 could be analyzed in any known manner to detect such issues, e.g., using a signal processor to identify unwanted frequencies, to identify beats/per/minute, to identify input loudness levels, etc. The signal processor could utilize analog circuits, such as filtering arrangements, or digital signal processing electronics implemented, e.g., with an application specific integrated circuit (ASIC) device.

Figure 2:
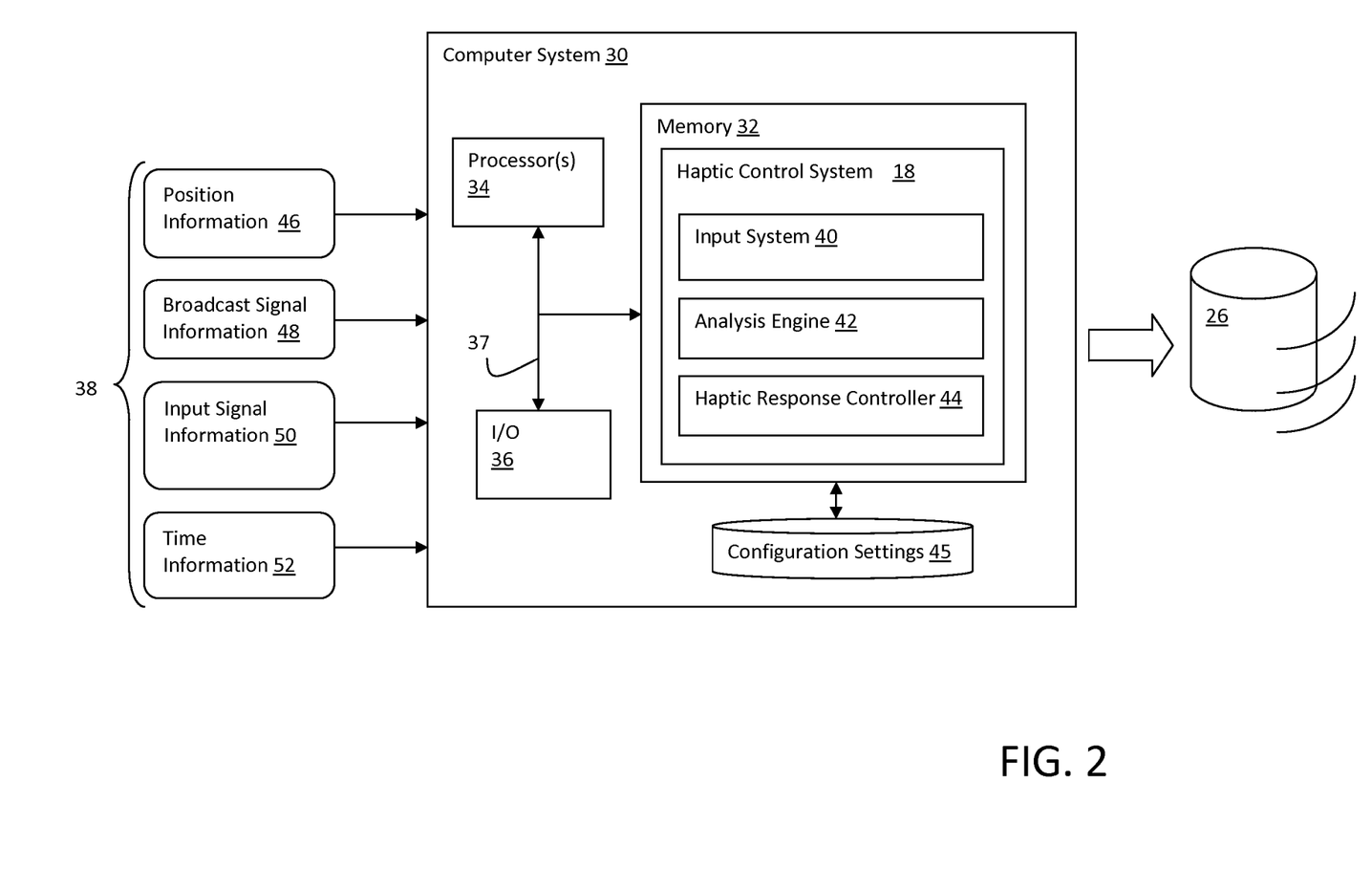
FIG. 2 depicts a computer system for implementing the haptic control system of FIG. 1 in accordance with embodiments of the present invention.

FIG. 2 depicts a computer system 30 having a haptic control system 18, suitable for incorporation into a wireless microphone. Haptic control system 18 includes: an input system 40 for receiving one or more external inputs 38 regarding a use of the wireless microphone; an analysis engine 42 for analyzing external input(s) 38 to determine if an alert condition exists; and a haptic response controller 44 for controlling and triggering haptic device 26. It is understood that computer system 30 may be distributed among two or more physical devices, such that some of the processing is done within the wireless microphone and some is done elsewhere (e.g., a haptic base module 18A shown in FIG. 1). Accordingly, physical construction may integrate haptic control system 18 completely into a microphone, headset, or other recording/broadcasting device. Alternatively, haptic control system 18 may be implemented within a separate module, potentially attached to a belt, in a pocket, on a strap, or some other location, either wired or with a wireless configuration.

As noted, various types of external input 38 are contemplated for input and analysis by haptic control system 18. Examples shown in FIG. 2 include: position information 46 (e.g., RFID field strength used to determine if the microphone is in an echo feedback zone), broadcast signal information 48 (e.g., output from a loudspeaker used to determine if there is distortion), input signal information 50 (e.g., audio signals inputted into the wireless microphone 10 used to determine if the user is singing out of pitch), and time allotment 52 (e.g., a running clock used to determine if the user has exceeded an allotted time). Obviously, additional types of external input 38 could be analyzed, and the inputs described herein are for illustrative purposes not intended to limit the scope of the invention.

Analysis engine 42 may utilize any technique or algorithm for analyzing an external input 38 to determine if an alert condition is met. For instance, in a case where position information 46 comprises the detection of an RFID tag 22 (FIG. 1), an alert condition would be automatically triggered by analysis engine 42. In other examples, signal information 48 could be analyzed using commonly known techniques to determine signal strength, and if a the signal strength was less than a threshold, an alert condition could be generated; performance characteristics 50 such as pitch could be analyzed using frequency analysis to identify unwanted frequencies and generate alert conditions; time information 52 could be compared to a running clock to determine if a time over-run condition exists, etc.

Once an alert condition is recognized, haptic response controller 44 can trigger activation of haptic device 26. In a simple example, haptic response controller 44 causes haptic device 26 to vibrate using an electromagnetic motor. In more advanced implementations, haptic response controller 44 can select a haptic response from a set of haptic response choices. For instance, a series of escalating haptic responses could be generated as the user gets closer and closer to an echo feedback zone. The types of input and/or responses utilized by haptic control system 18 may be determined based on configuration setting 45. The configuration settings 45 may for example be implemented using a program interface provided by the haptic control system 18.

Figure 3:
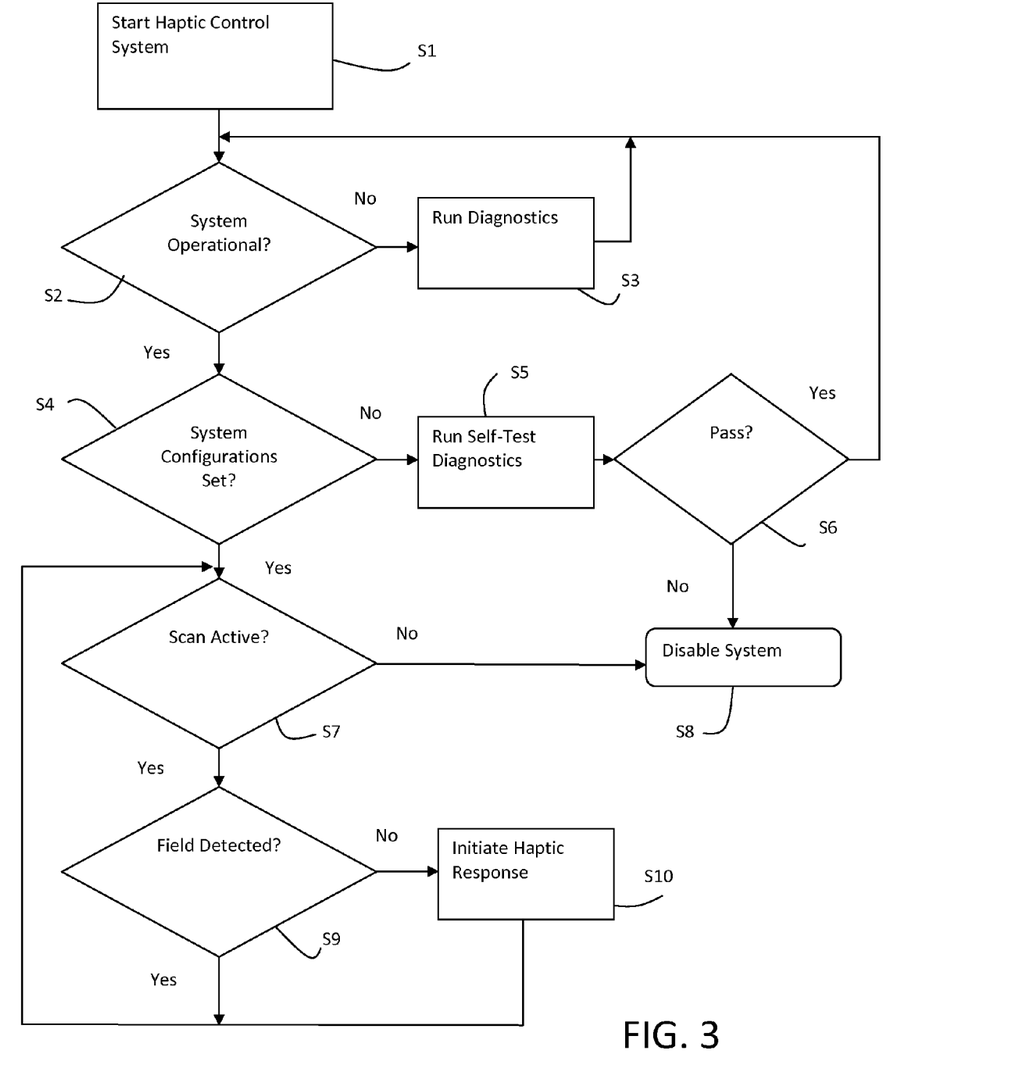
FIG. 3 depicts a flow diagram showing a process for implementing a haptic response in accordance with embodiments of the present invention.

FIG. 3 depicts a flow diagram (with reference to FIGS. 1-2) showing a process of implementing a haptic control system 18 ("system 18") that utilizes RFID tags 22 to alert the user when a wireless microphone 10 enters an undesired location. First, at 51, the haptic control system 18 is started, e.g., when the wireless microphone 10 is powered on. Next, at S2, a check is made to determine if the haptic control system 18 is operational. If no, a diagnostic process is run at S3 and the check at S2 is repeated. If yes, then a check is made to determine if the system configurations settings 45 associated with system 18 are properly set at S4. This may for example include checking haptic response settings stored in firmware. If no, the system 18 is configured at S5, e.g., with a user-configuration settings program. Once configured, a test is performed at S6 to determine if the new configuration settings 45 are properly implemented. If no, the system 18 is disabled at S8. If yes, the process loops back to S2.

Once the system configuration settings 45 are set, a determination is made at S7 whether the system 18 is operational and actively scanning for RFID tags 22. If no, the system 18 is disabled at S8. If yes, a check is made to determine if an RFID field is detected at S9. If no field is detected, the process loops back to S7. If a field is detected, a haptic response is outputted at S10. The type of haptic response may be determined based on the configuration settings 45, e.g., a first warning may comprises a single vibration, a second warning may comprise two vibrations, etc. After the haptic response is output, the system 18 loops back to S7.

Figure 4:
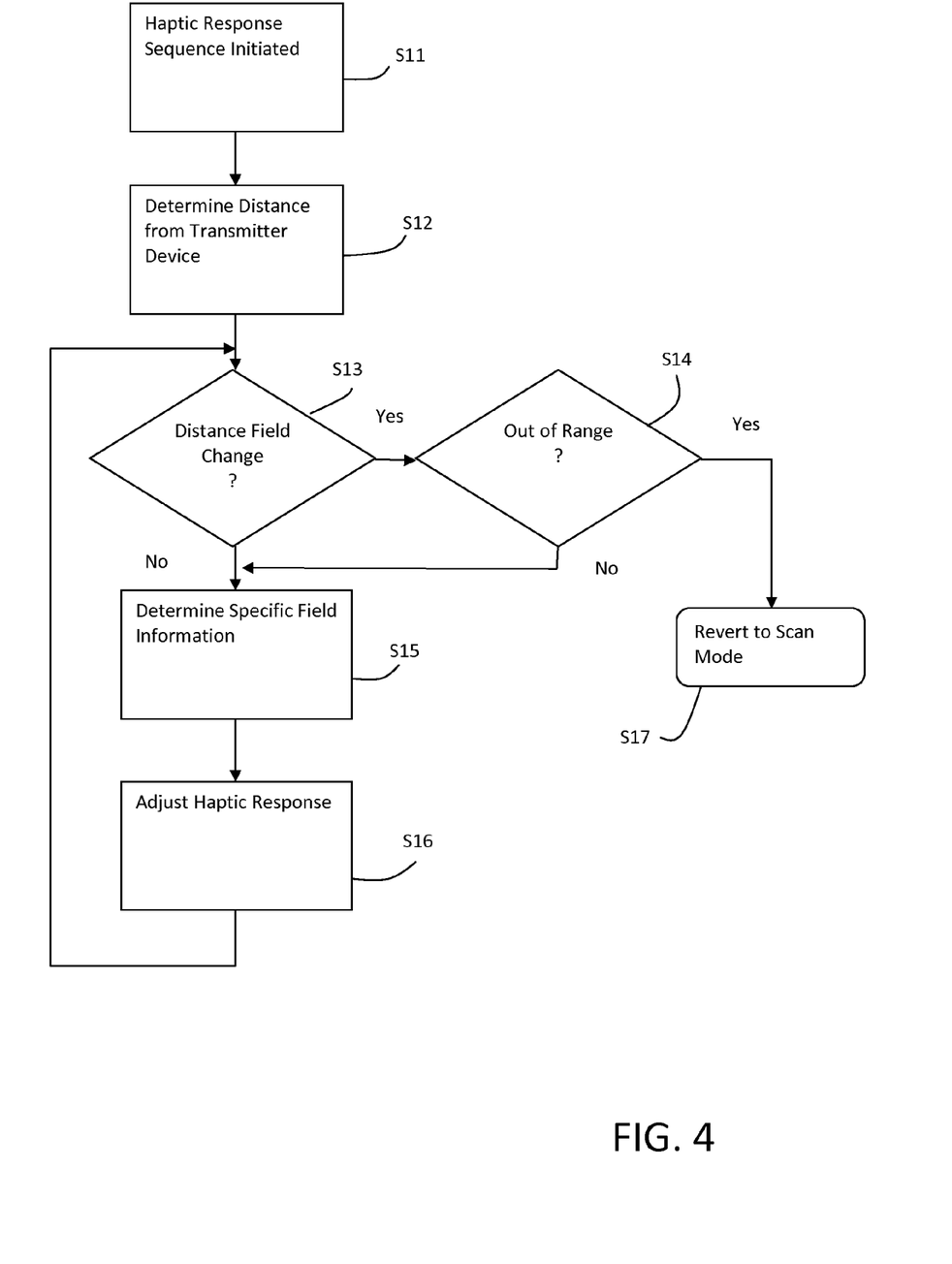
FIG. 4 depicts a flow diagram showing a process for altering haptic responses in accordance with embodiments of the present invention.

FIG. 4 depicts a sub-process for managing the generation of haptic responses based on proximity to an RFID tag 22. In particular, FIG. 4 describes an illustrative sub-process that can be implemented within process S10 of FIG. 3. At S11, a haptic response output sequence is initiated. At S12, the distance from the RFID tag 22 is determined based on a received RFID signal and at S13 a determination is made whether the distance field (i.e., location) of the wireless microphone 10 relative to the RFID tag 22 changed since a previous check. If yes, a determination is made at S14 whether the wireless microphone 10 is now out of range of the RFID tag 22, indicating that the user 23 has moved away from the problem location. If the wireless microphone 10 is out of range, then the system 18 reverts back to scan mode, i.e., process S7 of FIG. 3. If the wireless microphone 10 is not out of range or the distance field did not change, then the specific field information (i.e., current location of the wireless microphone relative to the RFID tag 22) is determined at S15. Based on this determination, the haptic response is adjusted at S16 and the process loops back to S13. Thus, for example, if the user was moving closer and closer to the RFID tag 22, then an escalating series of haptic responses could be issued until the user moved away.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer readable medium(s) having computer readable program code embodied thereon.

Any combination of one or more computer readable medium(s) may be utilized. The computer readable medium comprises a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Alternatively, the program product could be embodied on computer readable signal medium which may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer system 30 of FIG. 2 may comprise any type of computing device and is shown including a one or more processors 34, memory 32, an input/output (I/O) 36 (e.g., one or more I/O interfaces and/or devices), and a communications pathway 37. In general, processor(s) 34 execute program code, such as haptic control system 18, which is at least partially fixed in memory 32. While executing program code, processor(s) 34 can process data, which can result in reading and/or writing transformed data from/to memory 32 and/or I/O 36 for further processing. Pathway 37 provides a communications link between each of the components in computer system 30. I/O 36 can comprise one or more human I/O devices, which enable a user to interact with computer system 30. To this extent, haptic control system 18 can manage a set of interfaces (e.g., graphical user interface(s), application program interface, and/or the like) that enable human and/or system users to interact with the haptic control system 18. Further, haptic control system 18 can manage (e.g., store, retrieve, create, manipulate, organize, present, etc.) data, such as configuration setting, using any solution.

In any event, computer system 30 can comprise one or more general purpose computing articles of manufacture (e.g., computing devices) capable of executing program code. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, haptic control system 18 can be embodied as any combination of system software and/or application software.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A microphone, comprising:
  a haptic device embedded therein capable of outputting a plurality of different haptic responses; and
  a haptic control system having an input system for receiving different external inputs associated with uses of the microphone, an analysis engine for analyzing a received external input, and a haptic response controller for triggering a selected haptic response from the plurality of different haptic responses based on a type of received external input.

2. The microphone of claim 1, wherein each different haptic response comprises a non-auditory, non-visual sensory output.

3. The microphone of claim 1, wherein the selected haptic response comprises a series of escalating vibrations.

4. The microphone of claim 1, wherein the external input comprises position information.

5. The microphone of claim 1, wherein the external input comprises a radio frequency identification (RFID) field.

6. The microphone of claim 1, wherein the external input comprises information regarding an audio signal being broadcasted from a loudspeaker.

7. The microphone of claim 1, wherein the external input comprises information regarding an audio signal being inputted into the microphone.

8. The microphone of claim 1, wherein the external input comprises an amount of time.

9. The microphone of claim 1, wherein the external input comprises a signal generated from a remote user.

10. The microphone of claim 1, wherein the microphone is wireless.

11. A program product stored on a non-transitory computer readable storage medium, which when executed by a computer system, controls haptic response outputs for a microphone, comprising:
  program code for receiving different external inputs associated with uses of the microphone;
  program code for analyzing a received external input to determine if one of a plurality of different alert conditions exist; and
  program code for triggering one of a plurality of different haptic responses on a haptic device associated with the microphone based on a type of alert condition.

12. The program product of claim 11, wherein the external input comprises a radio frequency identification (RFID) field, and wherein one of the alert conditions indicate that the microphone is outside a predefined area determined by the RFID field.

13. The program product of claim 11, wherein the external input comprises broadcast signal information.

14. The program product of claim 11, wherein the external input comprises information regarding an audio signal being inputted into the microphone.

15. The program product of claim 11, wherein the external input comprises a signal generated from a remote user.

16. A method of providing haptic feedback in a microphone having a haptic device, comprising:
  receiving an external input associated with a use of the microphone;
  analyzing the external input to determine if an alert condition exists, wherein the alert condition indicates that the microphone is outside a predefined area; and
  triggering the haptic device when the alert condition is present.

17. The method of claim 16, wherein the external input comprises a radio frequency identification (RFID) field that defines the predefined area.

18. The method of claim 16, wherein the external input comprises broadcast signal information.

19. The method of claim 16, wherein the external input comprises information regarding an audio signal being inputted into the microphone.

20. The method of claim 16, wherein the external input comprises a signal generated from a remote user.

* * * * *